INVENTOR.
Joseph Richardson
BY
Morrison, Kennel Campbell
ATTORNEY.S

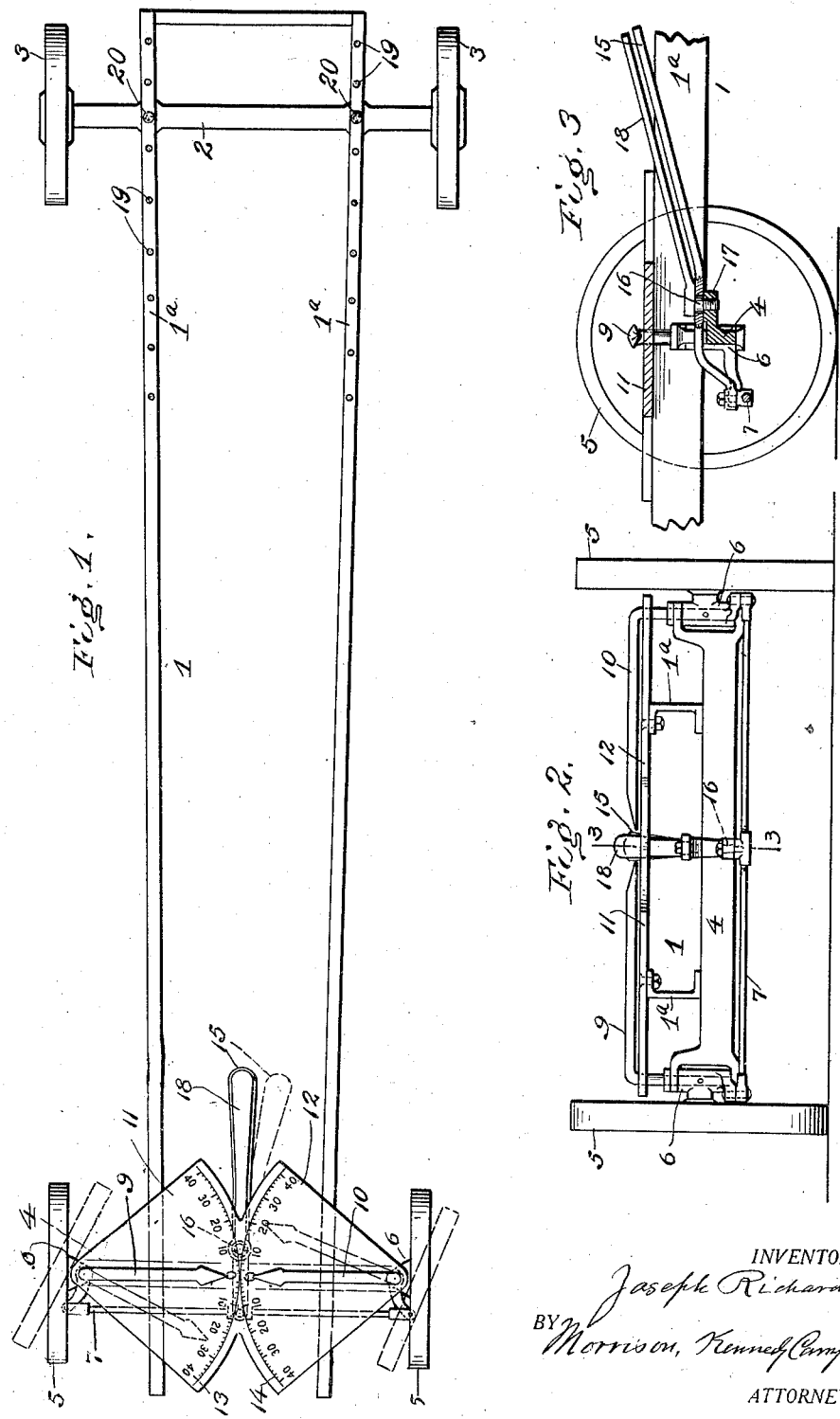

Patented June 10, 1930

1,763,441

UNITED STATES PATENT OFFICE

JOSEPH RICHARDSON, OF RIDGEFIELD, NEW JERSEY, ASSIGNOR TO FIFTH AVENUE COACH COMPANY, A CORPORATION OF NEW YORK

DEVICE FOR USE IN DETERMINING TURNING RADIUS OF MOTOR BUSSES

Application filed October 8, 1928. Serial No. 311,054.

This invention has for its object to guide the maker of motor busses, motor trucks, and the like, in respect to the degree of turning movement which the guide wheels will be capable of in order that the bus may turn around corners where the conditions are such as to the width of the streets and traffic regulations, etc., that the turn must be made within a certain limited radius; and the invention consists of a testing device in the form of a miniature bus structure, comprising a frame, front and rear axles, swiveling guide wheels, and means for adjusting and locking the guide wheels at different indicated angles, according to the particular radius within which it is required that the device shall turn; whereby information will be afforded in the construction of the full sized bus in respect to the degree of swiveling movement to be given the guiding wheels.

In the use of the device, a plan or diagram of the intersecting streets and street corners around which the full sized bus is to travel, is laid out on the floor or on a table or other suitable surface in the shops, and the guide wheels of the testing device are adjusted at such angle that the wheels of the device when the latter is run over the floor plan, will properly clear the corners and street limits; and such angular setting of the wheels being indicated in degrees, information will be thus furnished from which the construction of the full sized bus may be carried out in the shops to meet the street conditions existing on the outside.

The rear axle of the testing device may be attached to the frame so that it may be adjusted to and from the front axle and thus vary the length of the wheel base, and this adjustment may be made use of in connection with the setting of the front wheels to adapt the device to make turns which could not be taken care of by the angular adjustment of the guide wheels alone.

In the specification to follow, the invention will be described in detail, and the novel features thereof will be set forth in the appended claims.

In the accompanying drawings:

Fig. 1 is a plan view of the improved testing device;

Fig. 2 is a front elevation of the same on an enlarged scale;

Fig. 3 is a cross section on the line 3—3 of Fig. 2; and

Figure 4:
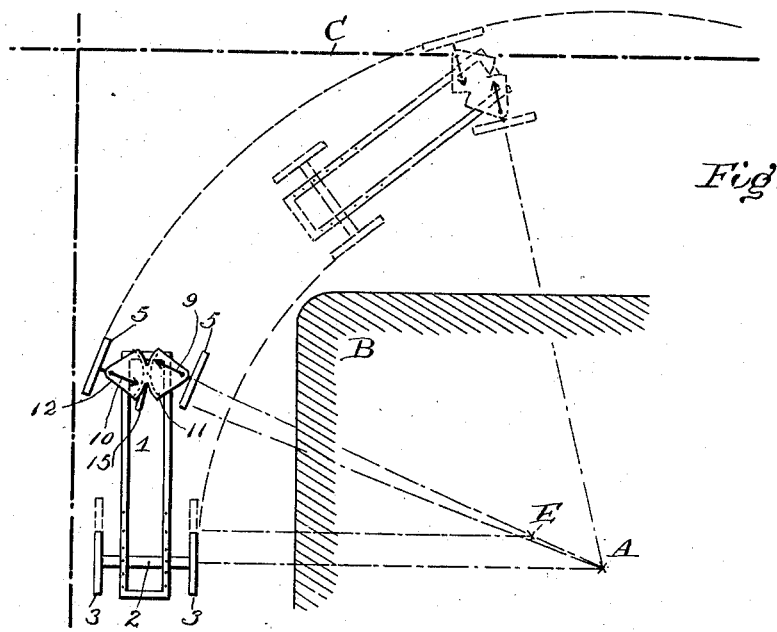
Figs. 4 and 5 are diagrammatic views showing how the device is used in determining the turning radius under given conditions.

Referring to the drawings:

Referring particularly to Figs. 1, 2 and 3, the testing device comprises in miniature or much reduced scale, the main elements of a motor bus structure, namely, a longitudinal frame 1 consisting of the two frame bars 1ª, corresponding to the chassis frame of the bus, a rear axle 2 adjustably attached to the frame in the manner to be more particularly described later on, and provided with carrying wheels 3, a front axle 4 fixed to the frame 1 near its front, and guide wheels 5 rotatably mounted on steering knuckles 6 journalled in bearings in the ends of the axle, the said steering knuckles being connected together by a connecting rod 7 to cause the knuckles to move in unison. The foregoing parts are of the same usual and ordinary construction as the corresponding parts in motor vehicle structures, being in the present instance constructed on a reduced scale, bearing a definite proportion to a full size bus, say one-third or one-fourth, to adapt the device to be used in the shops in contracted quarters for testing purposes.

In accordance with the present invention, horizontal pointers 9 and 10 are attached at their outer ends respectively to the journals of the streering knuckles so as to turn therewith, which pointers extend inwardly towards each other above and close to horizontal dial plates 11 and 12, which latter are fixedly fastened to the frame 1 and extend over the front axle. These dial plates are in the form of quadrants with their curved inner adjacent edges connected together at their middle portions, and they are provided with graduations 13 and 14 designed to be read in connection with the respective pointers, the graduations reading from zero on each plate, representing a neutral position of the pointers when the guiding wheels extend parallel to each other in the line of the axis of the frame, to 40° in both directions, and represent different angular positions of the wheels.

A hand lever 15 is provided for adjusting the guide wheels to the desired angles, which lever extends between the side bars of the frame and is fulcrumed near its forward end on a stud 16 which is screwed into a lug 17 extending rearwardly from the front axle. This stud is fixed to the forward end of a handle 18 extending above and closely adjacent the lever 15. The forward end of the lever is pivoted to the connecting rod 7 so that by swinging the lever to the right or left, the steering knuckles will be rocked and the guiding wheels thus adjusted to different angular positions relative to the longitudinal axis of the frame, in which motions of the steering knuckles, the pointers 9 and 10 will be caused to traverse the dial plates, and in connection with the graduations thereon the pointers will indicate in degrees the angular set of the wheels.

The lever 15 is held locked in its adjusted positions by means of the fulcrum stud 16 which, when screwed into the lug by the horizontal shifting of its operating handle 18, will clamp the lever 15 fixedly in position and thereby hold the guide wheels in their adjusted positions, it being understood that when the lever 15 is to be operated to readjust the wheels, the handle 18 will be operated to unscrew the stud and release the lever.

The rear axle as before explained is adjustable on the frame to and from the front axle in order to vary the wheel base, and this adjustment in the present instance is effected by providing the two frame bars 1ª with a number of holes 19 arranged at intervals in the length thereof, which holes are adapted to receive fastening bolts 20 screwed into the axle and securing the same fixedly to the frame.

In the use of the device a plan of the street intersections and corners to be turned by the full sized bus is laid out on the floor or other suitable surface in the shop, and the testing device is placed over this plan and the guide wheels adjusted by the adjusting lever to the proper angles to cause the wheels when the device is run over the plan, to clear the corners and street limits, the angles of which adjustment will be indicated in degrees by the pointers when read in connection with the graduations on the dials. From the information thus obtained by the use of the testing device, the bus maker will be readily enabled to so mount the guiding wheels that they may be turned to an angle which will enable the bus to turn on a radius which will clear the corners of the streets and the limits thereof over which the bus is to travel.

In Fig. 4, for instance, the testing device is shown with the guiding wheels set at a certain angle to give a turning radius whose center is at A. While this setting of the device will clear the corner B, the radius is so long that the wheels of the device will intersect the line C representing the street limit. It is necessary therefore to shorten the turning radius, and this may be effected by a further adjustment of the guiding wheels to a greater angle as shown in Fig. 5, where it will be seen that the device will not only clear the corner as before, but will clear also the line C indicating the street limit, the turning radius in this case being shorter than the previous turning radius and with its center at D.

It will be seen therefore that by running the testing device over the plan of the streets and by adjusting the guide wheels, an angular adjustment of the wheels may be finally secured which will permit the device to make a turn within the proper radius, the pointers in such adjustment indicating in degrees the angles to which the wheels are adjusted, and with such information, the full sized bus may be so designed as to meet the conditions obtaining in the streets over which the bus is to travel.

Figure 5:
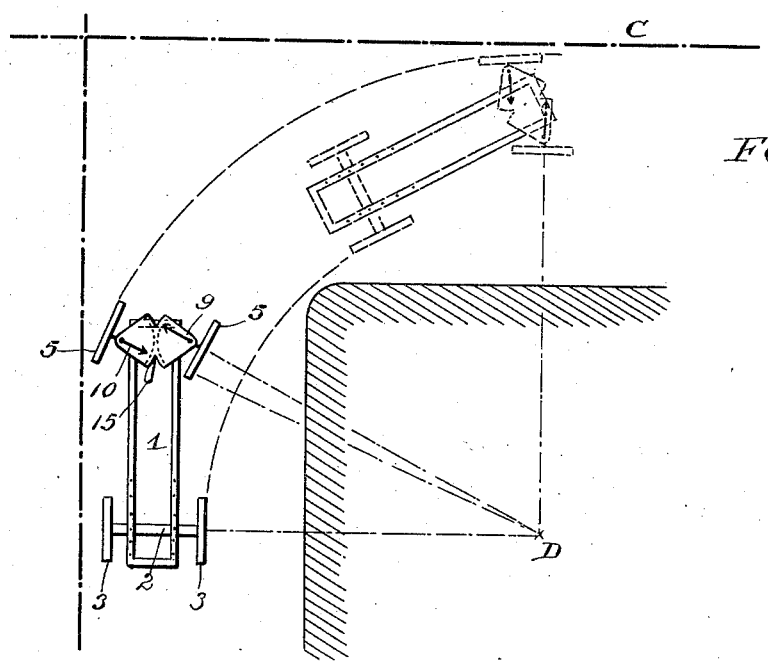

Instead of readjusting the angles of the wheels from the position shown in Fig. 4 to that shown in Fig. 5 in order to shorten the turning radius, the same result may be secured by shortening the wheel base by adjusting the rear axle closer to the front axle. This would have the effect of shortening the radius as indicated at E, so that the device will be enabled to make the proper turn on the shorter radius with the same angular adjustment of the wheels as in Fig. 5.

It is a fact that the turning radius of a bus or like vehicle in which swiveling guide wheels are employed, is affected to a large extent by the size of the wheels. It is therefore proposed to provide different sized wheels for the testing device, which wheels will bear a certain definite proportional relation to different sizes of tires for the full sized bus, so that the testing device may be used to determine the proper turning radii of the bus when employing tires of different sizes.

Having thus described my invention, what I claim is:

1. A testing device of the type described, comprising in combination, a frame, supporting wheels at one end, swiveling guide wheels at the other end, means for adjusting the swiveling wheels to different angular positions, means for indicating said positions, and means for locking them in their adjusted positions.

2. A testing device of the type described, comprising in combination, a frame, supporting wheels at the rear end, swiveling guide wheels at the front, a connecting member between said guide wheels to cause them to move in unison, a hand lever pivotally sustained by the frame and connected with the connecting member for swiveling the wheels, and a locking device associated with the hand lever for holding the wheels in their adjusted positions.

3. A testing device of the type described, comprising in combination, a frame, supporting wheels in the rear thereof, swiveling guide wheels at the front, pointers movable with the guide wheels in their swiveling action, fixed dial plates provided with graduations to be read in connection with the pointers, and means for adjusting the swiveling wheels to different angular positions.

4. A testing device of the type described, comprising in combination, a frame, carrying wheels at the rear thereof adjustable lengthwise of the frame, swiveling guide wheels at the front of the frame, means for adjusting the swiveling wheels to different angular positions, and means for locking the wheels in their adjusting positions.

5. A testing device of the type described comprising in combination, a frame, supporting wheels at the rear thereof, an axle on the front of the frame, swiveling guide wheels mounted on the axle, pointers connected at their outer ends to the swiveling wheels to be moved thereby in their swiveling actions, a plate sustained by the axle beneath the pointers and provided with graduations to be read in connection with the pointers, a lever pivoted to the axle and operatively connected with the swiveling wheels for adjusting the same, and a locking device for holding the lever in its adjusting positions.

6. A testing device of the type described comprising in combination, a frame, carrying wheels at one end thereof, swiveling guide wheels at the other end, a pointer movable with one of the swiveling wheels, a fixed dial plate provided with graduations to be read in connection with the pointer, means for adjusting the swiveling wheels to different angular positions, and means for locking the same in their adjusted positions.

In testimony whereof, this specification has been duly signed.

JOSEPH RICHARDSON.